N. BRAIBANT.
VEHICLE WHEEL.
APPLICATION FILED DEC. 17, 1908.

996,831.

Patented July 4, 1911.

3 SHEETS—SHEET 1.

Witnesses:
C. H. Crawford
E. Schallinger

Inventor:
Nestor Braibant
by B. Singer Attorney.

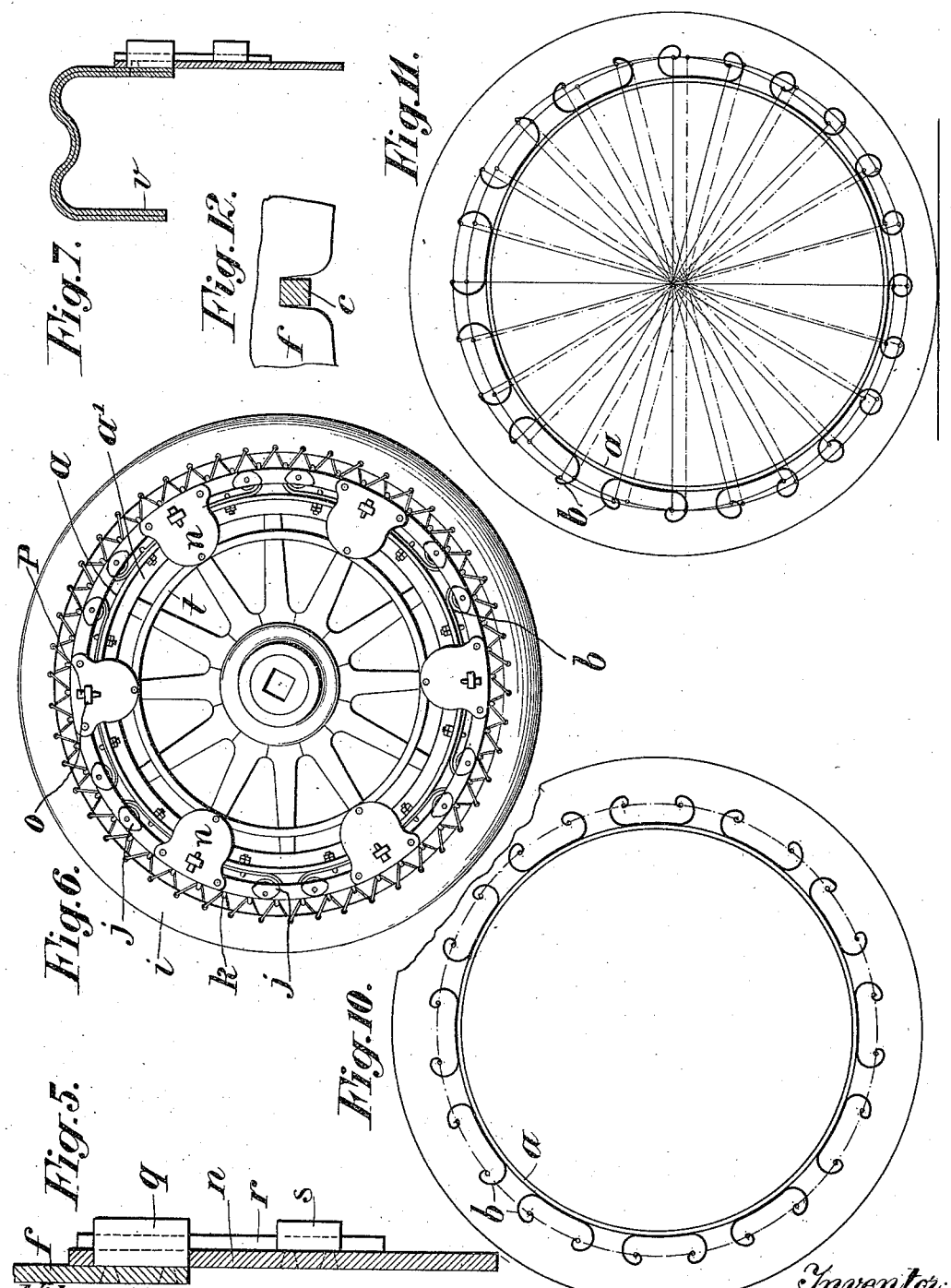

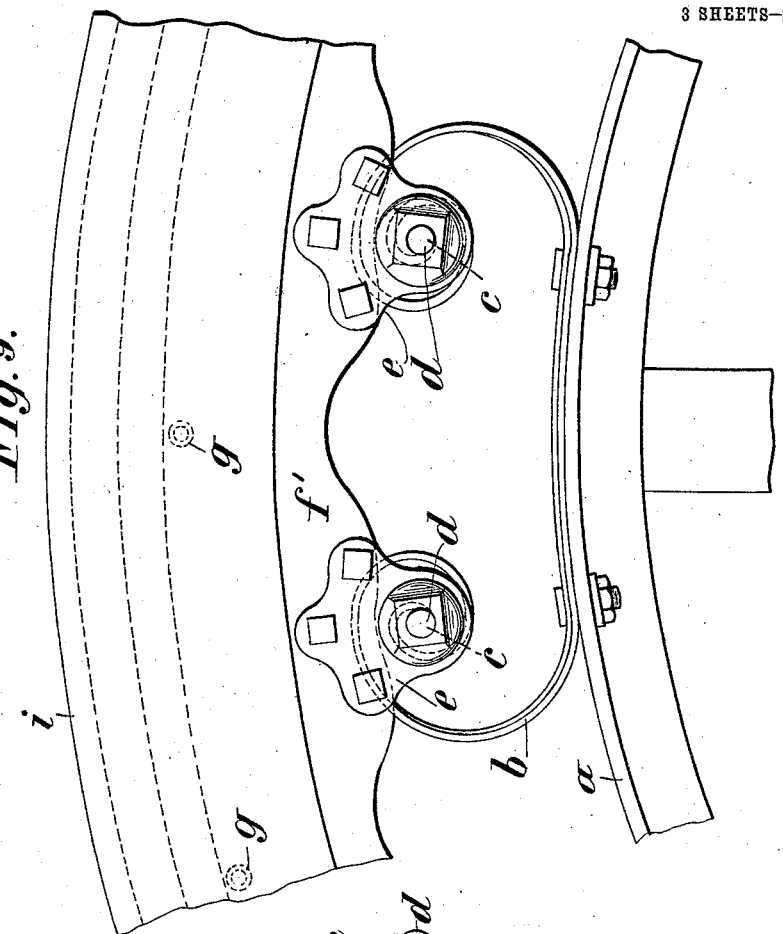
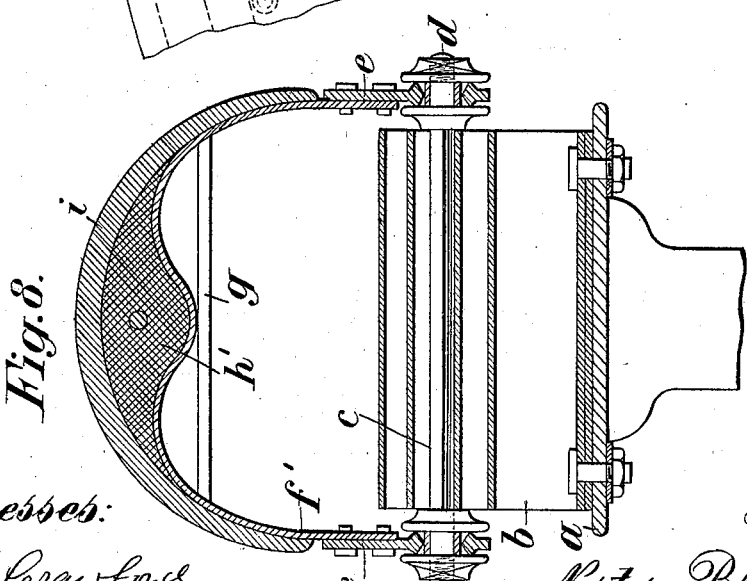

UNITED STATES PATENT OFFICE.

NESTOR BRAIBANT, OF BRUSSELS, BELGIUM.

VEHICLE-WHEEL.

996,831.  Specification of Letters Patent.  Patented July 4, 1911.

Application filed December 17, 1908. Serial No. 468,053.

*To all whom it may concern:*

Be it known that I, NESTOR BRAIBANT, a subject of the King of Belgium, and resident of Brussels, Belgium, have invented certain new and useful Improvements in and Relating to Vehicle-Wheels, of which the following is a specification.

This invention relates to an elastic wheel made of steel and especially intended for use in motor cars, the object of the invention being to provide a wheel of this kind which differs from an ordinary wheel in that the air tube and the india rubber tire are replaced by a series of metallic springs applied to the wheel rim and arranged between the latter and a rigid steel cover or tire guided in its lateral deviations by a ball abutment or similar contrivance so as to provide a wheel which will be perfect from the point of view of the friction and the suppleness as well as from that of the solidity of its construction.

Figure 1:
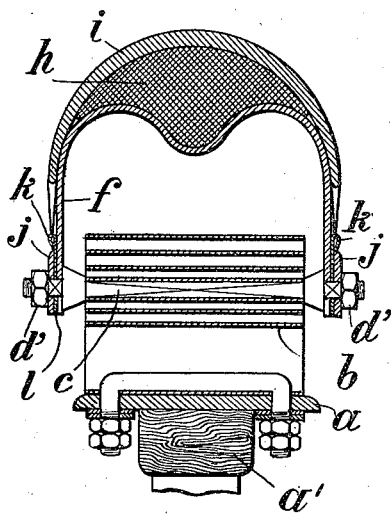
Figure 3:
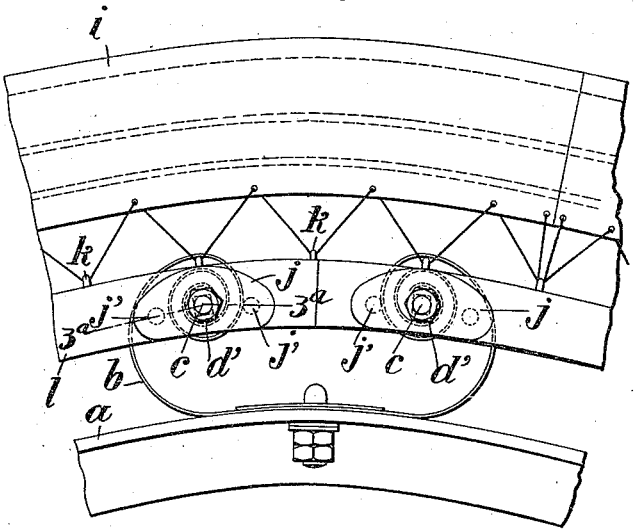
Figure 2:
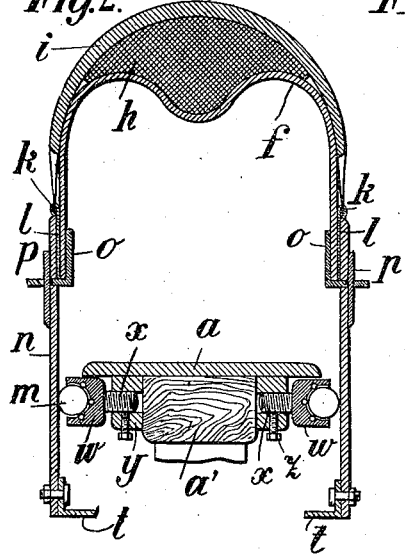
Figure 4:
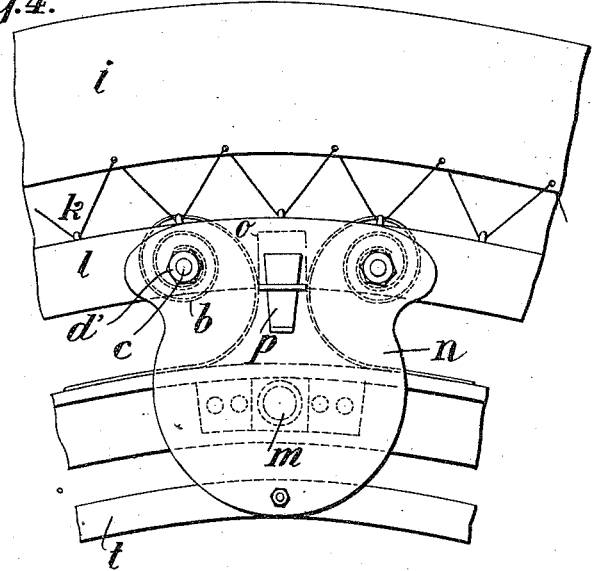

In the accompanying drawings, given by way of example: Figure 1 is a cross sectional view of the tire and the wheel rim this section being made at the point of fixation of one of the shafts of the springs to the tire. Fig. 2 is a cross sectional view of the same tire and the same rim this section being made at the place of a point of fixation of a ball abutment. Fig. 3 is a side elevation view of a part of the tire showing the method of fixing the springs. Fig. 3ª is a sectional view taken on line 3ª—3ª of Fig. 3.
Fig. 4 is a side elevation view of the tire showing a ball abutment. Fig. 5 shows a partial cross section of one form of connection of the guide plate and the cover. Fig. 6 is a side view of the entire wheel; Fig. 7 shows a detail. Fig. 8 shows a cross sectional view of the tire and the rim of another embodiment of my invention; Fig. 9 is a side elevation view of a fragment of same; Fig. 10 shows a diagrammatic side elevation view of the wheel (the lateral abutments being omitted). Fig. 11 is a similar diagram of the wheel showing the movements which the tire performs with reference to the axle during the rolling motion of the wheel. Fig. 12 is a fragmentary view drawn at a somewhat enlarged scale of the cover.

The wheel in its first embodiment (Figs. 1 to 7) comprises a central part $a'$, made preferably of rim wood and upon which is keyed or put by pressure (shrunk) an iron or steel rim $a$ which is larger than the first one. This iron or steel rim is adapted to receive (bolted thereto) springs $b$ formed of two spirals coiled in opposite directions and interposed between the rim $a$ and the cover $f$ to which they are connected by means of fixed shafts $c$ forming the shafts of the spirals. These shafts have a square section and are provided at their ends with screw threaded trunnions and are held stationary with reference to the cover owing to their being passed through square holes made in the fixing or counter-plates $j$ provided with studs $j'$ penetrating into the cover; nuts $d'$ are provided which effect anchorage of the whole; besides in this modification shown in Fig. 12 the cover $f$ is cut away at the place of the shafts $c$ of the springs so as to be adapted to engage the latter as shown by Fig. 12. Thanks to this arrangement the shafts $c$ cannot rotate either in the cover or in the corresponding spiral and consequently the springs, which form intermediary elastic means between the rim and the cover can work only by torsion; besides these shafts perfectly stay or brace the wing of the cover. The cover $f$ has about the shape and section of the rubber cover of a pneumatic wheel. It is made of Martin steel sheets or, better still, of nickel steel; it is stamped or pressed and welded so as to form only one piece; this cover is still characterized in its outer part by a more or less deep undulation which increases its rigidity; this undulation allows of a solid rubber tire $h$ following the undulation of the cover being applied to the latter, this rubber tire $h$ being protected by a leather strip or band $i$ sectioned in several places and secured by flexible members to the eyelets $k$ of a cut sheet metal strip $l$ which is engaged between the cover $f$ and the counter-plates $j$ used for securing the shafts of the springs. The invention also provides a lateral abutting device adapted to prevent any lateral deviation of the tire with reference to the inner wheel, which deviation may occur especially in curves; to this end the inner wheel is provided under the iron rim and against the wooden rim $a'$ with a set of balls $m$ (Fig. 2) one form of this ball bearing being composed of balls of $\frac{1}{2}$ or $\frac{5}{8}$ inch in diameter and being four, six or eight in number on each side of the rim and arranged in regularly spaced relation. Against each of these balls abuts a guide plate $n$ (Figs. 2 and 4) which is secured to the envelop by means of the nuts $d'$ of the two spring shafts and by an angle iron $o$ (Fig. 2) passing through the wing of the cover and held in place by a wedge $p$. It will be seen that the plate $n$ occupies the place of two securing plates of the spring shafts. In the place of the angle iron, it would still be possible to use the device shown by Fig. 5 where the wing of the cover $f$ carries riveted to it a socket $q$ into which one engages a wedge $r$ which slides along the guide plate $n$ and engages another socket $s$ riveted to the latter plate. The ball of each ball bearing moves in a cup $w$ (Fig. 2) made of wrought iron and in one or more pieces, this ball being mounted on a set of small balls $\frac{1}{8}$ of an inch in diameter, these small balls being freely mounted in the said cup or embedded in the metal of the latter. Furthermore, with a view of allowing of the control of the transverse play the cups are mounted on a screw threaded rod $x$ which moves in a nut $y$ secured to the wooden rim $a'$, the screws being maintained in the desired position in the nuts by a set screw $z$.

The second form of embodiment of my elastic wheel (Figs. 8 and 9) solely differs from the first one in that the connection between the shafts and the cover $f'$ is effected by the brackets $e$ riveted or bolted to the cover, the shafts $c$ being secured thereto by means of nuts screwed on the screw threaded studs $d$. The said brackets are constructed so as to allow the placing of the wings of the cover at such a distance from each other that the cover can be easily slid over the springs and that consequently it is thus possible to change the cover without being obliged to change any of the members of the tire. Besides, in this form of embodiment tractional rods $g$ stiffen and brace the upper part of the cover $f'$ and tire $h'$.

Constructed as above described the wheel may be compared as a whole with a large ball bearing, as very well shown by Fig. 6.

This wheel has substantially no friction either at the springs or at the axles; it is therefore almost entirely silent. Its suppleness is equal to that of a pneumatic tire; it gives a better suspension to the chassis of the motor car. All the springs act simultaneously and carry each a certain part of the weight of the car whatever may be the position in which they are. The center of the cover always is to be found on the axis of the wheel but when the metallic cover meets with an obstacle, its axis leaves that of the wheel $a$ (Fig. 11) and all the points of its circumference are shifted of an equal length; the lower springs are crushed, those of the summit of the wheel are vertically lengthened and those of the sides move parallelly with reference to the rim. As readily seen the wheel does not rest upon a single spring, but on all the springs at a time; a shock received by any one of the points of the tire is deadened not by the spring situated immediately below but by all the members of the circumference which thus play the same part as those of a pneumatic tire. Suppose that the force of the springs be calculated for giving a certain yield when the car is at rest, as soon as the car is moving, the shaft of the springs will move at each revolution of the wheel, along a circle the radius of which is equal to the distance between the center of the wheel and that of the cover. The starting is softer than with the ordinary wheels, this result being due to the fact that the wheel exerts a slight circular torsion on the springs at the moment of starting. The spirals are coupled as indicated by Figs. 3 and 9 so that the pressure and the tension exerted on the cover may be rendered uniform and distributed on the circumference. The springs will be a little stronger for the rear wheels by reason of the double supporting and driving work they have to do.

The solidity of the above described metallic tire is great, its lasting properties nearly indefinite and its upkeep nearly *nil*. The only member to replace is the leather band when it is worn out. As this band has no tensioning effort to support, it may be made of ordinary leather and as it is divided into sections only the deteriorated part will have to be replaced which will cause only a very small expense.

Having now fully described my said invention, what I claim and desire to secure by Letters Patent, is:

1. A vehicle wheel comprising in combination with the hub, rigid spokes and rim therefor, of a plurality of flat leaf springs spaced apart from each other circumferentially on said rim, each spring comprising a central or base portion curved to conform to the curvature of said rim and lying flat thereon and rigidly secured thereto, and having its ends bent outwardly radially spirally inwardly toward each other in opposite directions, a tread portion located radially outwardly from the ends of said springs and from said rim and having radially inwardly projecting extensions spaced apart from each other and disposed abreast of the sides thereof and below said rim, adjustable anti-friction means on said rim engaging said extensions to prevent lateral movement of said tread portion with respect to said rim, and means non-rotatively secured in the ends of said springs for connecting said tread portion therewith.

2. A vehicle wheel comprising in combination with the hub, rigid spokes and rim therefor, of a plurality of flat leaf springs spaced apart from each other circumferentially on said rim, each spring comprising a central or base portion lying flat on said rim and curved to conform to the curvature thereof and rigidly secured thereto and having its ends spirally bent radially and inwardly toward each other and in opposite directions, a tread portion located radially outwardly from the ends of said spring and from said rim, extensions projecting inwardly from said tread portion abreast of and inwardly below said rim, means for removably locking said extension to said tread portion, adjustable anti-friction means on said rim for engaging said extensions, and means non-rotatively secured at the ends of said springs for connecting the tread portion therewith.

In testimony whereof I have hereunto set my hand in presence of two witnesses.

NESTOR BRAIBANT.

Witnesses:
 C. VAN VELSEN,
 GREGORY PHELAN.

---

Copies of this patent may be obtained for five cents each, by addressing the "Commissioner of Patents, Washington, D. C."